United States Patent [19]

Nakajima et al.

[11] Patent Number: 5,805,846
[45] Date of Patent: Sep. 8, 1998

[54] SYSTEM AND METHOD FOR DYNAMICALLY SHARING AN APPLICATION PROGRAM AMONG A PLURALITY OF CONFERENCE DEVICES WHILE MAINTAINING STATE

[75] Inventors: Amane Nakajima, Machida; Makoto Kobayashi; Fumio Ando, both of Kawasaki, all of Japan

[73] Assignee: International Business Machines Corporation, Armonk, N.Y.

[21] Appl. No.: 754,518

[22] Filed: Nov. 21, 1996

Related U.S. Application Data

[63] Continuation of Ser. No. 371,915, Jan. 12, 1995, abandoned.

[30] Foreign Application Priority Data

Feb. 14, 1994 [JP] Japan ...................................... 6-017269

[51] Int. Cl.$^6$ ...................................................... G06F 13/00
[52] U.S. Cl. ...................................... 395/330; 395/200.04
[58] Field of Search ...................................... 395/329–332, 395/200.04, 200.12, 330; 379/202

[56] References Cited

U.S. PATENT DOCUMENTS

| | | | |
|---|---|---|---|
| 5,195,086 | 3/1993 | Baumgartner et al. | 395/153 |
| 5,208,912 | 5/1993 | Nakayama et al. | 395/153 |
| 5,280,583 | 1/1994 | Nakayama et al. | 395/200 |
| 5,283,861 | 2/1994 | Dangler et al. | 395/153 |
| 5,353,398 | 10/1994 | Kitahara et al. | 395/153 |
| 5,363,507 | 11/1994 | Nakayama et al. | 395/153 |
| 5,379,374 | 1/1995 | Ishizaki et al. | 395/153 |
| 5,491,743 | 2/1996 | Shiio et al. | 379/202 |
| 5,491,798 | 2/1996 | Bonsall et al. | 395/200.04 |
| 5,533,183 | 7/1996 | Henderson, Jr. et al. | 395/344 |
| 5,537,548 | 7/1996 | Fin et al. | 395/200.04 |

OTHER PUBLICATIONS

Ensor et al., "Control issues in multimedia conferencing", Proceedings of TRICOMM '91: IEEE Conference on Communications Software: Communications for Distributed Applications and Systems, pp. 133–143, Apr. 1991.

Ahuja et al., "Coordination and control of multimedia conferencing", IEEE Communications Magazine, v. 30, n. 5, pp. 38–43, May 1992.

Ahuja et al., "A comparison of application sharing mechanisms in real–time desktop conferencing systems", Conf. on Office Information Systems, SIGOIS Bulletin, v. 11, n. 2–3, pp. 238–248, Apr. 1990.

Ahuja et al., "Networking requirements of the Rapport multimedia conferencing system", IEEE INFOCOM '88, pp. 746–751, Mar. 1988

(List continued on next page.)

*Primary Examiner*—Joseph R. Burwell
*Attorney, Agent, or Firm*—Whitham, Curtis, Whitham & McGinn; Kevin M. Jordan, Esq

[57] ABSTRACT

A method for dynamically sharing an application in a conference system while maintaining state regardless of whether the application is under execution in all conference devices. The conference system includes a plurality of conference devices with at least one conference device executing an application program. The method for dynamically sharing the application program among the plurality of conference devices in the conference system while maintaining state, includes the steps of: communicating a request to share the application program from a requesting conference device which is executing the application to all enrolled conference devices; storing an executed state of the application program to be shared in the requesting conference device; starting the application program to be shared by enrolled conference devices in which an application program corresponding to the application program to be shared is not started; communicating the executed state stored in the requesting conference device to all enrolled conference devices; and processing by all enrolled conference devices of the application program to be shared in a shared executed state equal to the executed state communicated.

5 Claims, 14 Drawing Sheets

OTHER PUBLICATIONS

Ohmori et al., "Distributed cooperative control for sharing applications based on multiparty and multimedia desktop conferencing system: MERAID", Proceedings of the 12th Int'l Conf. on Distributed Computing Systems, pp. 538–546, Jun. 1992.

Maeno et al., "Distributed desktop conferencing system (MERMAID) based on group communication architecture", ICC '91, v. 1, pp. 520–525, Jun. 1991.

*At&T Vistium™ Share Software User Guide*, At&T Global Information Solutions, Ch.'s 4 & 5, pp. 4–1 to 4–20 & 5–1 to 5–26, Jul. 1994.

"Applications shared across HP. Sun, IBM and SGI", *HP Professional*, v. 8, n. 1, p. 58(1), Jan. 1994.

*InSoft® Communique!™ User's Guide (version for UNIX)*; InSoft® Inc., Ch.'s 2,8, & 16, pp. 35–70, 131–162, and 261–268, Jan. 1994.

T. Ohmori et al., "Cooperative Control for Sharing Applications based on Distributed Multiparty Desktop Conferencing System: MERMAID", Supercomm—International Conference on Communications 92, vol. 2, 14 – 18 Jun. 1992, Chicago, pp. 1069–1075.

W. H. Leung et al., "Multimedia Conferencing Capabilities in an Experimental Fast Packet Network", Proceedings—International Switching Symposium 1992, vol. 2, 25 – 30 Oct. 1992, Yokohama, Japan, pp. 258–262.

10: CONFERENCE SYSTEM
12: NETWORK
$16_1$ TO $16_K$ : TERMINALS
$18_1$ TO $18_K$ : USERS

Conference event CE (Conference Events)

| Conference event | | [Event name] | <Parameter> |
|---|---|---|---|
| Conference processing termination | | TERMINATE | (none) |
| Basic | New | NEW | toolNumber, toolID |
| | Opening | OPEN | toolNumber, toolID |
| | Closing | CLOSE | toolNumber, toolID |
| | Deletion | DELETE | toolNumber, toolID, confID |
| Sharing | Start of assignment | BEGINSHARE | toolNumber, toolID, confID |
| | End of sharing | ENDSHARE | toolNumber, toolID, confID |
| Participant | Addition | ENROLLED | confID, userID |
| | Deletion | UNENROLLED | confID, userID |
| New participation and exiting | Start of participation | ENTER-START | confID, userID |
| | Completion | ENTER-COMPLETE | confID, userID |
| | Start of Existing | LEAVE-START | confID, userID |
| | Completion | LEAVE-COMPLETE | confID, userID |
| Control Unit | Registration | FLOOR-REGISTERED | toolNumber, confID, floorID |
| | Erasure | FLOOR-UNREGISTERED | toolNumber, confID, floorID |
| | Arrangement | FLOOR-ENQUEUED | toolNumber, confID, floorID, userID |
| | Release | FLOOR-RELEASED | toolNumber, confID, floorID, userID |
| | Acquisition | FLOOR-OBTAINED | toolNumber, confID, floorID, userID |
| | Cancel | FLOOR-CANCELLED | toolNumber, confID, floorID, userID |

FIG.4

SYSTEM AND METHOD FOR DYNAMICALLY SHARING AN APPLICATION PROGRAM AMONG A PLURALITY OF CONFERENCE DEVICES WHILE MAINTAINING STATE

RELATED APPLICATIONS

This application is a continuation of U.S. patent application Ser. No. 08/371,915, filed Jan. 12, 1995, now abandoned.

FIELD OF THE INVENTION

The present invention relates to a conference system control method, a conference device, and a conference system, and, more particularly, to a conference system control method, a conference device, and a conference system for opening a conference by using a plurality of conference devices connected by a network or communication line such as a LAN, ISDN, or telephone line.

BACKGROUND OF THE INVENTION

In a conference system, each of a plurality of users connects each terminal to a line or network to open a conference while transferring data between terminals. In this type of system, conference systems for realizing an application program (hereafter referred to as an application) which can be shared by all users are roughly divided into "centralized" and "decentralized."

The centralized system allows data to be input to an application from a plurality of user terminals and transmits output data to all user terminal. Rapport uses a centralized system (S. R. Ahuja, J. R. Ensor, and D. N. Horn, "The Rapport Multimedia Conferencing System," Proc. COIS 88, pp. 1–8, 1988).

However, the centralized system is not preferable because much data is output from the application, increasing the load on hardware. Moreover, the centralized system is restricted in that the system must be applied to a server-client window system in which display processing and control are independently performed like the X-WINDOW SYSTEM which operates on UNIX.

The decentralized system ensures the same state by executing the same application in each user terminal and cooperatively operating each application. The system is used for ASSOCIA (Yoshiyuki Nakayama et al., "A Computer-Supported Multiparticipant Realtime Teledialogue System," Thesis, Journal of the Information Processing Society of Japan, Vol. 32, No. 9, pp. 1190–1199, 1991) and MMConf (T. Crowley et al., "MMConf: An Infrastructure for Building Shared Multimedia Applications," Proc. CSCW 90, pp. 329–342, 1990).

ASSOCIA keeps a plurality of instances (entities) of an application in the same state by ensuring at the system side that all data values input to all applications from a plurality of users coincide with each other in a time series. Therefore, it is possible to share the "instances" of all applications and keep them in the same state when start and execution are simultaneously performed in a plurality of user terminal.

With ASSOCIA, however, when a user by whom an application currently executed is not shared is going to share the application, the state of an application of a user who already shares the application may not coincide with the state of an application of a user who is going to share the application in the middle. That is, the application currently executed has already-read execution files and states such as attribute values of the present application (e.g. cursor location, expansion or contraction, and fonts). Therefore, even if the same applications are started by other user terminals at the initial state and the same input is given to applications after they are shared, it is impossible to realize a shared application which coincides with any other application because each state when the application is shared differs. Therefore, to keep a currently-executed application in a consistent state when the application is shared, a low-level consistency of giving the same input is insufficient.

Also, in the case of MMConf, it is possible to keep a plurality of manifestations of applications simultaneously started in the same state but it is impossible to keep a shared application consistent because processing for sharing an application is not assumed.

As another example of the above-mentioned, the official gazette of Japanese Patent Laid-Open No. Hei 3-192845 discloses a method for controlling an interaction system serving as a conference system, which realizes a dialogue by the fact that a plurality of users accesses a network of terminals. This method realizes a dialogue equivalent to a conference by processing participation in the dialogue and the exit of a user who can attend a conference (enrollee) from the dialogue by each terminal so that participation and exiting can be done easily.

However, the above interaction system control method only processes the participation in and exit from a dialogue equivalent to a conference. Therefore, it is impossible to keep a shared application consistent at the start of a conference and during the conference because processing for sharing an application is not assumed.

Moreover, the official gazette of Japanese Patent Laid-Open No. Hei 4-186456 discloses a common information processing system serving as a conference system making it possible for a plurality of users to perform a dialog and common information processing by connecting terminal to a network or line. This system allows each user to process electronic information in common with other terminals by performing a dialogue while referencing the same output result and so on.

However, the common information processing system also has a restriction in that the system must be applied to a server-client window system in which display processing and control are independently performed like the X-WINDOW SYSTEM which operates on UNIX.

Thus, there is a need for a more cost-effective conference system and method which allows dynamic sharing of applications regardless of whether a user is currently executing the application. The present invention addresses such a need.

SUMMARY OF THE INVENTION

It is therefore an object of the present invention to provide a conference system whereby all user terminals executing a common application are maintained in a same state.

It is yet another object of the present invention to bring user terminals joining a conference already in progress to a same state as other user terminals in the conference.

According to the invention, a plurality of individual user terminals are joined together by a network. In operation, a requesting user terminal runing an application program requests a conference. While the application program may be of any type, for the purposes of illustration, a blackboard program is run whereby conferees attending the conference can write on the blackboard and erase the blackboard just as a conferee might do when physically attending a conference in a conventional conference room. The requesting user terminal issues a request to share the application program with all conferee user terminals causing all conferee user terminals to load the application program. The requesting user terminal then transmits the current state of the application program to the conferee user terminals such that all user terminals are brought to the same state and the conference can proceed with all conferees seeing the same things on their individual terminals.

A callback protocol memory is also provided for storing a processing program and identifiers corresponding to event information whereby when a state of the application is changed, such as by, for example, a conferee writing a message on the blackboard, the new state of the application is transmitted to all user terminals participating in the conference such that all such terminals maintain a same state.

BRIEF DESCRIPTION OF THE DRAWINGS

FIG. 4 is a corresponding diagram showing types of conference events, names, and parameters;

Description of Symbols

10 . . . Conference system
12 . . . Network
$16_1$ to $16_K$ . . . Terminal units
$18_1$ to $18_K$ . . . Users

DETAILED DESCRIPTION OF THE PREFERRED EMBODIMENT

Embodiments of the present invention are described below by referencing the accompanying drawings.

Figure 1:
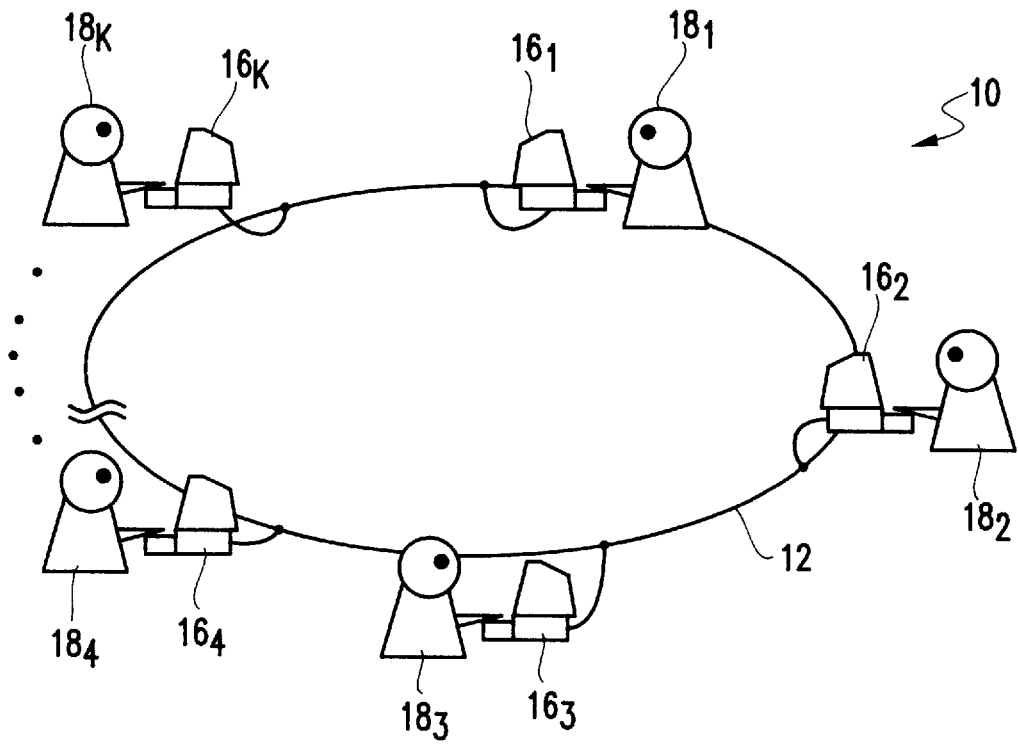
FIG. 1 is a schematic block diagram showing the conference system of the first embodiment.

As shown in FIG. 1, a conference system 10 which is the first embodiment comprises an annular network 12 for sending/receiving a digital signal and K (a natural number) terminals $16_1$ to $16_K$ connected to the network 12. In the conference system 10, transfer data is transmitted through the network 12. Each terminal $16_1$ to $16_K$ is operated by users $18_1$ to $18_K$. The network 12 is not restricted to the above networks (Ethernet and Token Ring Network). It is possible to use a public telephone network, a network such as ISDN, or a combination of them as the network 12. Moreover, each terminal $16_1$ to $16_K$ stores a conference room system 11 as an execution program for progressing a conference through terminals among a plurality of users as described later.

Figure 2:
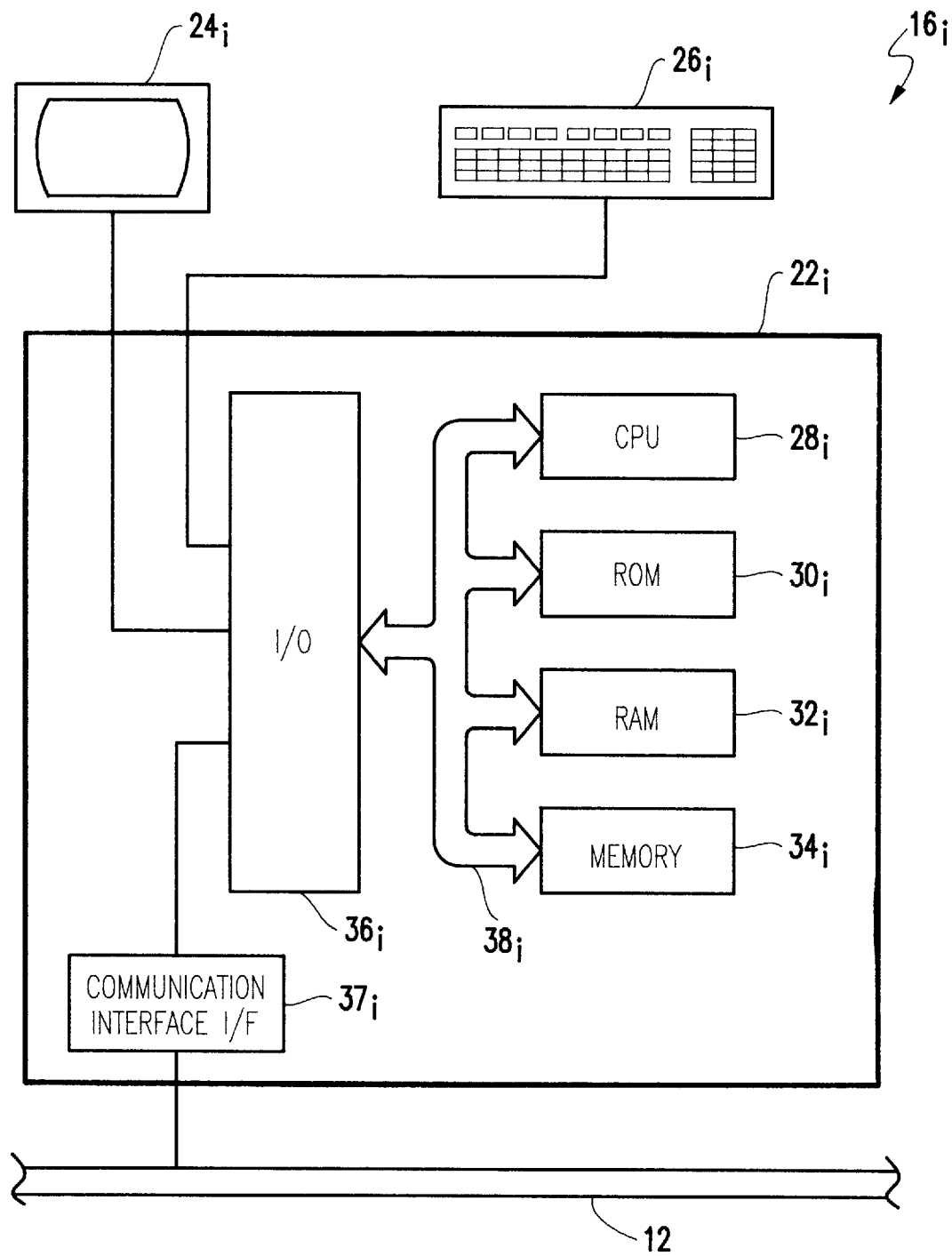
FIG. 2 is a schematic block diagram showing a terminal of the first embodiment.

As shown in FIG. 2, the terminal $16_i$ (i:$1 \leq i \leq K$) comprises a personal computer (hereafter referred to as a PC) $22_i$ serving as a controller, a display $24_i$ serving as a display, and keyboard $26_i$ serving as an input unit. In addition to the above constitution, it is possible to connect a liquid crystal display or projector serving as a display, a mouse serving as a coordinate input unit, a camera serving as an image input unit, a microphone serving as a voice input unit, and a pair of speakers serving as voice output units. The microphone and the two speakers can be replaced with a head set such as a telephone set or transceiver. Moreover, it is possible to set the two speakers so as to produce a stereophonic effect or it is possible to use three or more speakers for multichannel reproduction or use one speaker for monaural reproduction. Input processing can be made on a CRT without using a keyboard by connecting a mouse and voices can be input or output by connecting a microphone and a speaker. In addition to the above constitution, it is possible to connect a digitizer serving as a coordinate input unit, a printer serving as an output unit, and a scanner serving as an input unit.

A PC $22_i$ comprises a CPU $28_i$, ROM $30_i$, RAM $32_i$, memory $34_i$, and an input/output port I/O $36_i$ connected by a bus $38_i$ so that data and commands can be transferred between them. Memory $34_i$ can use external memory such as a floppy disk drive, hard disk drive, or optoelectronic memory. The input/output port I/O $36_i$ is connected to the network 12 through a communication interface I/F $37_i$ and also connected to the display $24_i$ and keyboard $26_i$.

Figure 3:
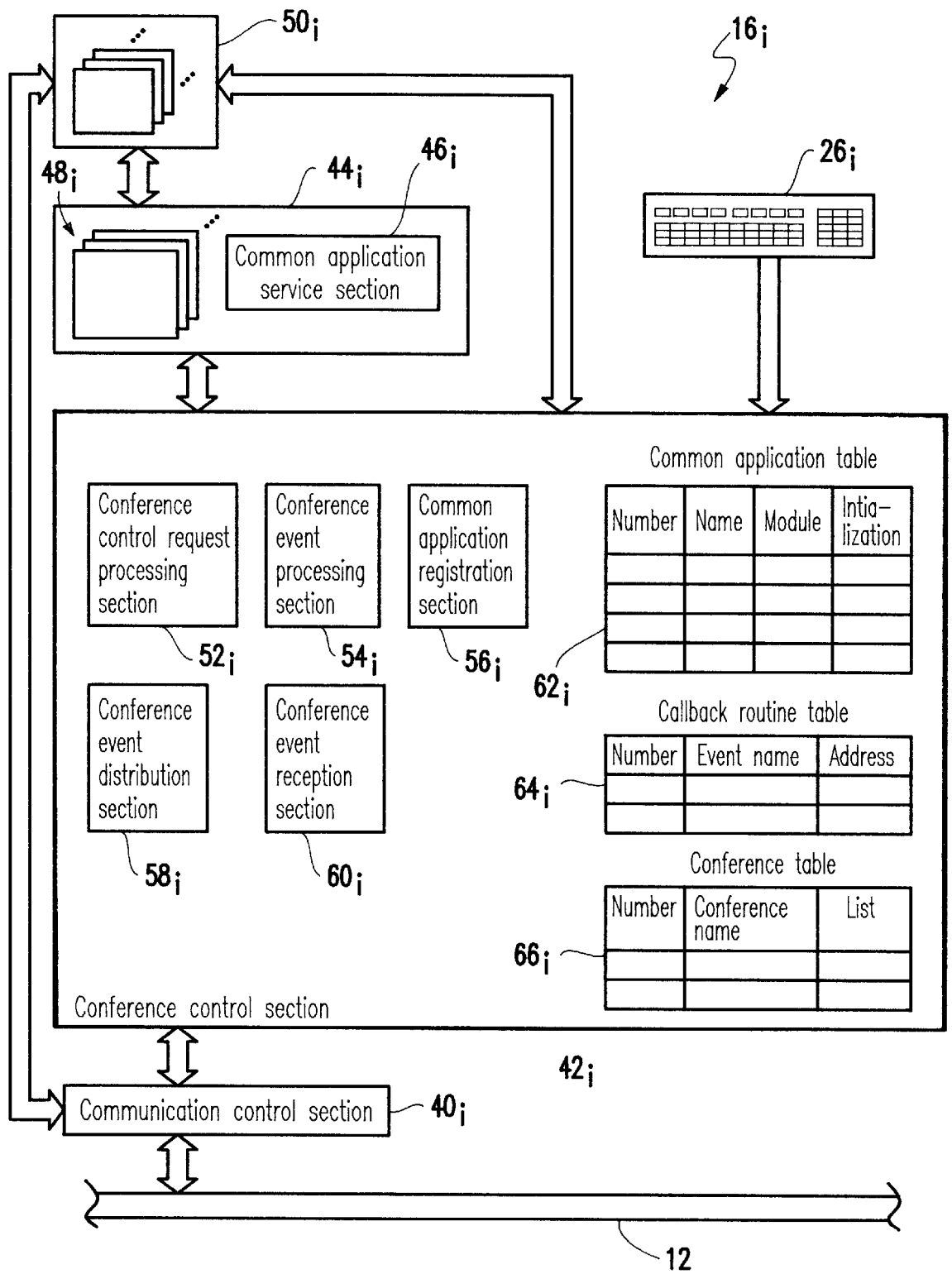
FIG. 3 is a block diagram showing the rough internal constitution of the computer of a terminal of the first embodiment.

In FIG. 3, the outline of the internal constitution of the PC $22_i$ for realizing the conference room system 11 in the terminal $16_i$ is shown in the form of a block diagram for each function. The PC $22_i$ has a communication control section $40_i$ for communicating data or the like with another PC$_j$ (j:$1 \leq j \leq K$, i≠j), a conference control section $42_i$ (described later) for controlling conference operations such as opening and closing of a conference (hereafter referred to as a conference room) opened among a plurality of terminal and an enrollee's entering and exit the room, a common application section $50_i$ comprising one or more programs which are shared by enrollees in the conference room and concurrently used (e.g., a program or the like of a common blackboard on which a character or a diagram can be written or on which a character or diagram can be erased), and a common application management section $44_i$. The common application management section $44_i$ includes a callback routine section $48_i$ comprising a processing program (hereafter referred to as a callback routine) to the common application section $50_i$ for various instance processing (hereafter referred to as conference events; described later) in the case of the call of a common application service section $46_i$, and the common application section $50_i$ or operations of a conference. The common application service section $46_i$ stores a processing routine included in a common application (e.g., a program for storing a state of a common application), which is called by an individual common application or by the common application service section $46_j$ ($i \neq j$) of another terminal.

The communication control section $40_i$ is connected to the network 12 in order to exchange data with a plurality of terminal used for one conference through a wide-area network such as a LAN or ISDN and also connected to the conference control section $42_i$ and the common application section $50_i$. The communication control section may perform one-to-one data transfer to and from another terminal separately from an opened conference. The conference control section $42_i$ is connected to the common application section $50_i$, common application management section $44_i$, and keyboard $26_i$. The common application section $50_i$ is connected to the common application management section $44_i$.

The conference control section $42_i$ is a control section for processing a request for generation or deletion of a conference room, communicating with the conference control section $42_j$ of another terminal to process the acceptance of the request, and performing processing so as to synchronously keep the same contents relating to new enrollees in a conference and to the fact that a user having an application operating sends a conference event such as replacement or the like to the common application section $50_i$. For example, the section $42j$ manages a conference member as a enrollee to a conference and the common-application use right and has a function for notifying the common application of a change in the number of conference enrollees, of moving the use right to a conference enrollee as a conference event.

Thus, for the conference system 11 of this embodiment, the conference control section $42_i$ for operating a conference and the common application section $50_i$ which is a conference event section simultaneously used by enrollees in a conference and stores common applications are independently constituted.

As shown in FIG. 4, the conference event CE shows details of conference state change. The conference event CE comprises an event name and a parameter. Corresponding to the conference event CE, a callback routine for processing the conference event CE concerned is previously registered in the callback routine section $48_i$. In FIG. 4, event names TERMINATE, NEW, OPEN, CLOSE, and DELETE are shown as the conference event CE for basic conference operations such as termination of conference processing, new conference, opening of conference, closing of conference, and deletion of conference; event names BEGINSHARE and ENDSHARE are shown as the conference event CE for sharing a requested common application such as beginning of assignment and ending of assignment for sharing; event names ENROLLED and UNENROLLED are shown as the conference event CE for changing enrollees in a conference room such as addition and deletion of enrollees; event names ENTER-START, ENTER-COMPLETE, LEAVE-START, and LEAVE-COMPLETE are shown as the conference event CE for newly participating and exiting a conference room such as new participation and exiting; and event names FLOOR-REGISTERED, FLOOR-UNREGISTERED, FLOOR-ENQUEUED, FLOOR-RELEASED, FLOOR-OBTAINED, AND FLOOR-CANCELED are shown as the conference event relating to the conference room control right such as entry, deletion, assignment, release, acquisition, and cancellation of the control right.

Parameters serving as arguments of event names as the conference events include toolNumber, toolID, confID, userID, and floorID. The parameter toolNumer corresponds to an identification number corresponding to a type of common application, the parameter toolID corresponds to an identification number when using a plurality of common applications for one conference under different states, the parameter confID shows a conference room number (e.g., serial number), the parameter userID corresponds to a user's identification number, and the parameter floorID corresponds to an identification number corresponding to a type of control right.

As shown in FIG. 3, the conference control section $42_i$ comprises a conference control request processing section $52_i$, a conference event processing section $54_i$, a common application registration section $56i$, a conference event distribution section $58_i$, a conference event reception section $60_i$, a common application table $62i$, a callback routine table $64_i$, and a conference table $66_i$.

The conference control request processing section $52_i$ processes a request for conference state change from the terminal of its own or another terminal. The conference event processing section $54_i$ generates or delivers a conference event corresponding to a conference state change. The common application registration section $56_i$ dynamically registers a common application at start or the like. The conference event distribution section $58_i$ distributes and outputs a conference event for a conference state change request to enrollees who can attend the conference. The conference event reception section $60_i$ receives a conference event for a conference state change request from another terminal.

The common application table $62_i$ is provided with serial numbers for common applications and stores serial numbers, common application names, the address of the module concerned where one common application is loaded in RAM (memory) as a module, and the address of the common application initialization routine. The callback routine table $64_i$ stores common application serial numbers in the common application table $62_i$, event names, and call back routine address. The conference table $66_i$ stores the number for a conference room which is currently opened and in which the user $18_i$ can participate, the conference room name, and the list of users who can use the conference room. Memory in which common applications are loaded is not restricted to RAM. It is possible to separately connect memory so that data is transferred to and from a terminal or add EMS memory or a cache memory. In this case, it is also possible to form main memory by adding EMS memory or cache memory to the terminal so that data can be loaded. This constitution is preferable because the device constitution is simplified.

A common application name (e.g., name of a dynamic link library to be loaded) used by a user in the conference room system 11 is stored beforehand in the common application management section $44_i$ as an application file APF.

The following is a description of the functions of this embodiment. For each terminal described below, a conference room to be opened (used) when starting a conference program references the conference table $66_i$. That is, a user who can attend a plurality of conference rooms is repeatedly entered in the conference table $66_i$. Therefore, for example, one or more conference rooms are selected by displaying the conference room list in the conference table $66_i$ or a plurality of conference rooms is selected by default at the start of the program. One field is registered in the conference table $66_i$ when a conference device is held. For example, when the user $18_i$ opens a conference room, an identification number is given to the conference room and a conference room name corresponding to the identification number and a list of users who can attend the conference room are stored. It is preferable to obtain consent from persons who can attend the conference room before storing a list of them. Though a plurality of conference rooms can be registered in the conference table $66_i$, the use of a single conference room use is described below to simplify the description. Executing a plurality of conference rooms on a terminal is to process a plurality of conference rooms by means of individual time-sharing one by one. Therefore, this processing corresponds to the processing of each conference room by means of individual time-sharing interrupts or so-called window processing displaying a plurality of conference rooms on a screen and selectively using a specific conference room.

Figure 5:
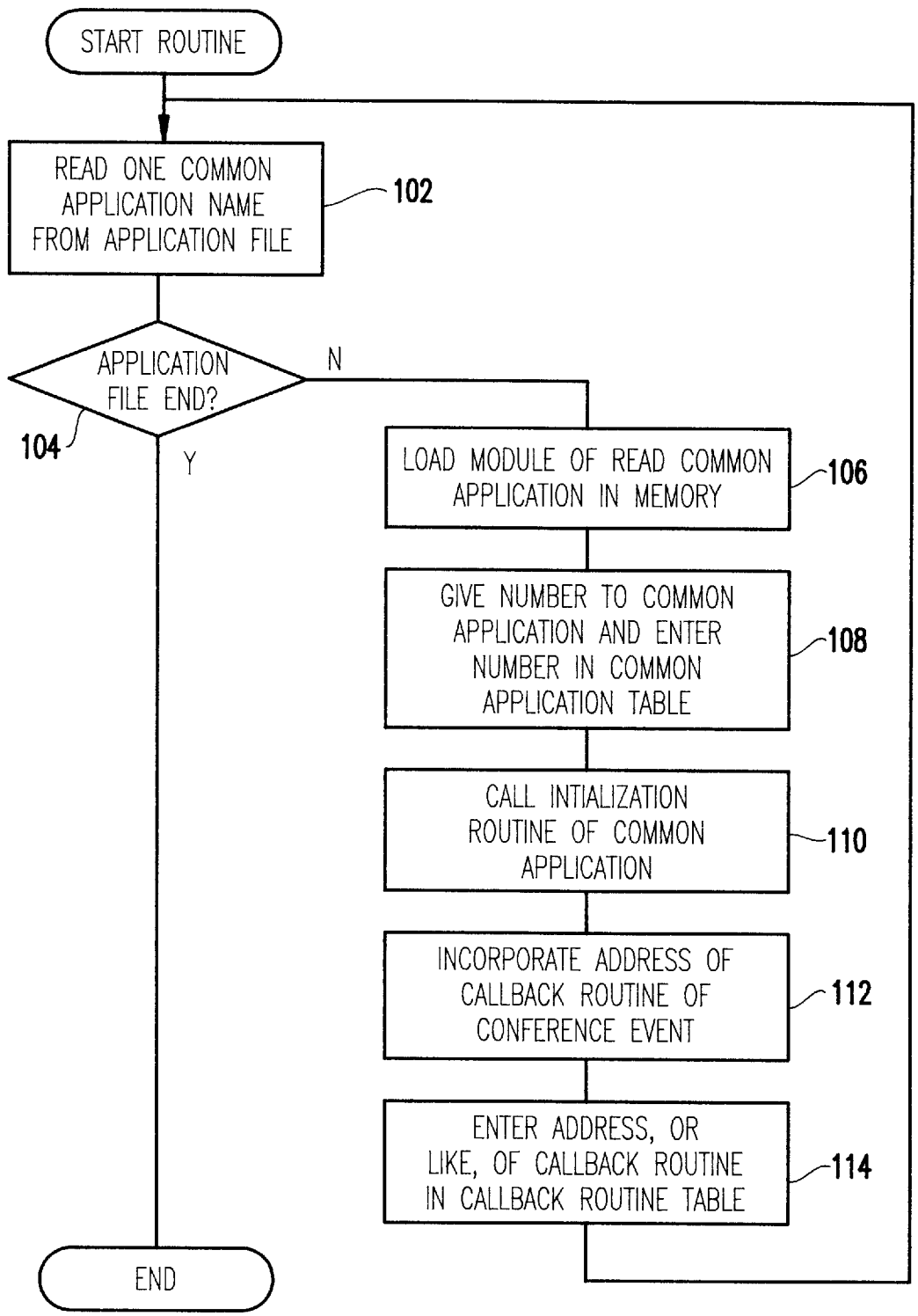
FIG. 5 is a flowchart showing the flow of a start for dynamically incorporating a common application.
Figure 6:
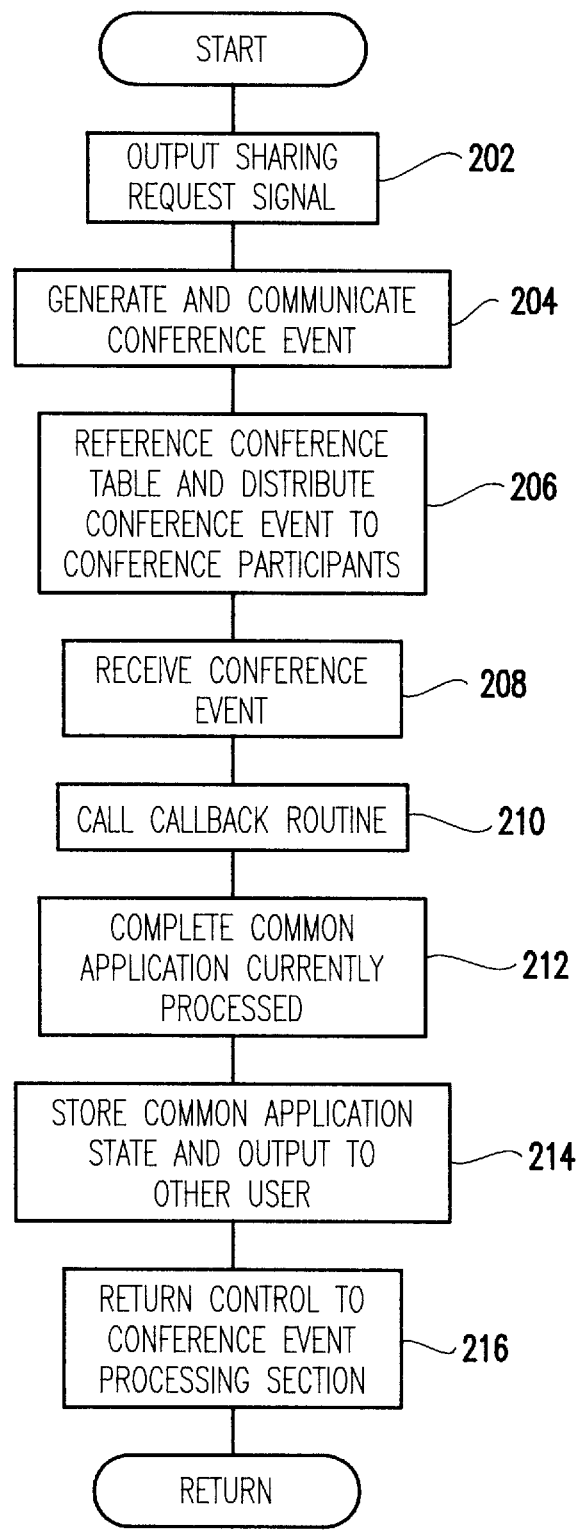
FIG. 6 is a flowchart showing the flow of processing in a requesting terminal when a plurality of users shares a common application.
Figure 7:
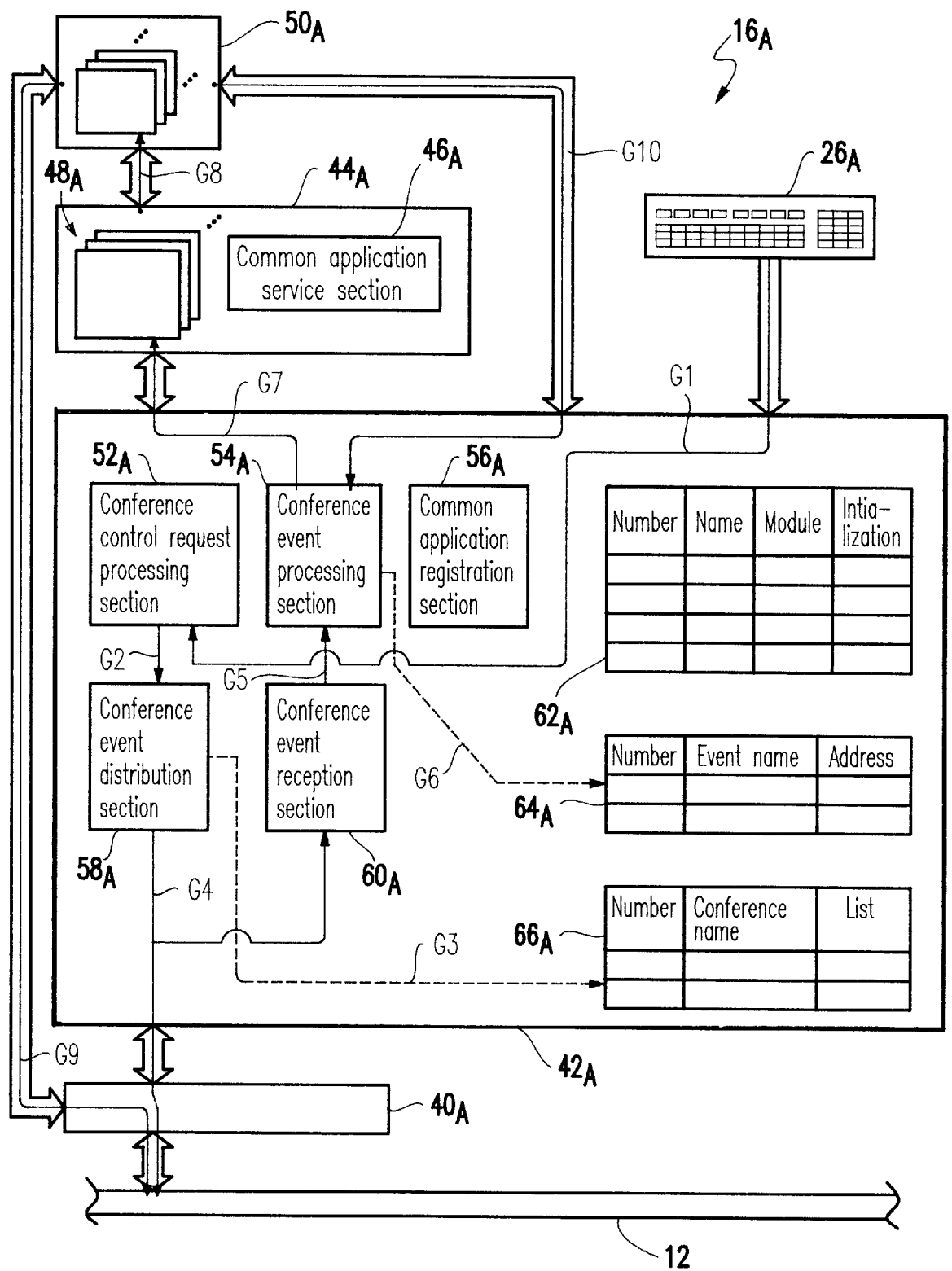
FIG. 7 is a conceptual view showing the flow of processing in a requesting terminal when a plurality of users shares a common application.

First, a method for obtaining only the common application necessary for operating the conference concerned or a common application to be executed only by each user from a plurality of common applications included in the common application section $50_i$ and how the conference control section of each user transfers data to and from a common application are described below together with "Starting routine" in FIG. 5.

When a power switch (not shown) of a PC $16_i$ of a terminal is turned on and the terminal $16_i$ is ready for operation and the conference room system 11 for performing operations such as opening of a conference and participation in the conference is started through a keyboard, the common application registration section $56i$ of the conference control section $66_i$ reads one common application name from the application file APF storing common application names (step 102). Then, it is determined whether all common application names stored in the application file APF are read by determining the end of the application file APF (step 104). In the case of a negative determination, a module stored in memory $34i$ corresponding to a common application with the read name is loaded in RAM (memory) by the common application registeration section $56_i$ (step 106). The common application registration section $56_i$ gives a serial number to the common application with the read name and enters the serial number, the common application name, the address of the module loaded in RAM (memory), and the address of an initialization routine in the common application table $62_i$ (step 108). The initialization routine is located at a predetermined location (e.g., first opening function) of the loaded module, which sets a default and includes the address of a callback routine corresponding to a conference event included in a common application. Then, the common application registration section $56_i$ calls the initialization routine of the common application with the read name (step 110) and obtains the address of a callback routine corresponding to a conference event from the called initialization routine (step 112). Then, the common application registration section $56_i$ establishes a correspondence between the address of the callback routine thus obtained, a common application number and an event name and enters the common application number, event name, and callback routine address in the callback routine table $64_i$ (step 114).

The above processing is repeated for all common application names stored in the application file APF.

Therefore, the conference control section $42_i$ defines conference state change details as conference events (FIG. 4) and reports defined conference events to the common application section $44_i$. Thereby, it is possible for a plurality of conference events of a common application to keep a consistent state independent of the conference state change. They correspond to window events in a window system. Each common application registers its own callback routine in the conference control section $42_i$ for a conference event required by each common application to keep conference event consistency for each terminal in the initialization routine of each common application. When conference states change, the conference control section $42_i$ calls the callback routine registered for the conference event. Thereby, it is possible to dynamically incorporate common applications, which are for a conference necessary at the start of a conference program without changing the states of the conference control section.

A method for sharing a common application currently executed in the terminal of a user by all conference enrollees in the same state independent of a conference room currently opened i s described below by referencing FIGS. 6 to 9. To simplify the description, it is assumed that a common editor S which is the common editor S serving as a common application locally executed only at the terminal $16_A$ of a user A in a conference room opened by three users A, B, and C is shared by the three users. It is also possible to assume that a common application executed only by one user outside the conference room is shared by three users.

According to input through a keyboard $26_A$ of the user A, a request for sharing the conference event of the common editor S is output to a conference control section $42_A$ of the terminal $16_A$ of the user A (step 202). This request is input to a conference control request processing section $52_A$ (signal path G1, FIG. 7).

The conference control request processing section $52_A$ of the user A generates a conference event CE with the event name BEGINSHARE necessary for processing and outputs the conference event (event name: BEGINSHARE) to a conference event distribution section $58_A$ (step 204, signal path G2). The conference event distribution section $58_A$ references a conference table $66_A$ (signal path G3 in FIG. 7) to determine that users A, B, and C are enrollees at a conference room and distributes the conference event to these three users (step 206). The conference event is also distributed to the user A who requested sharing of the conference event and the transfer data designating users B and C is output to terminal $16_B$ and $16_C$ of users B and C through a communication control section $40_A$ and the network 12 (signal path G4).

Conference event reception sections $60_A$, $60_B$, and $60_C$ of users A, B, and C receive a conference event. Details of processing for users B and C are described later. The conference event received by the conference event reception section $60_A$ is output to a conference event processing section $54_A$ (step 208, signal path G5).

The conference event processing section $54_A$ reads a conference number and common application number from the parameter of the input conference event(depicted in FIG. 4), references a callback routine table $64_A$ (signal path G6) to obtain the address of a callback routine corresponding to the conference event of the common application, and requests starting of the callback routine (signal path G7). A common application management section $44_A$ calls the requested callback routine and starts it (step 210). The conference event processing section $54_A$ waits for the next processing until the processing of the callback routine terminates. This processing is executed in the callback routine of the common editor independently of the conference control section.

The callback routine of the common application orders the common editor S of the user A to terminate processing (signal path G8) and the common editor S terminates processing currently being executed (step 212).

When receiving termination of processing, the common application section of the user A stores the current state of the common editor S (e.g., read data file, portion currently edited, or cursor location) and outputs the stored state to users B and C (step 214, signal path G9).

After state output to users B and C terminates, the common application section $50_A$ outputs a termination signal to the conference event processing section $54_A$ to terminate processing of conference event which is conference control in the conference event processing section $54_A$ (step 216, signal path G10).

Processing by terminals $16_B$ and $16_C$ of users B and C is described below. Because almost the same processing is performed for users B and C, processing by the terminal $16_B$ of the user B is described below for simplicity.

Figure 8:
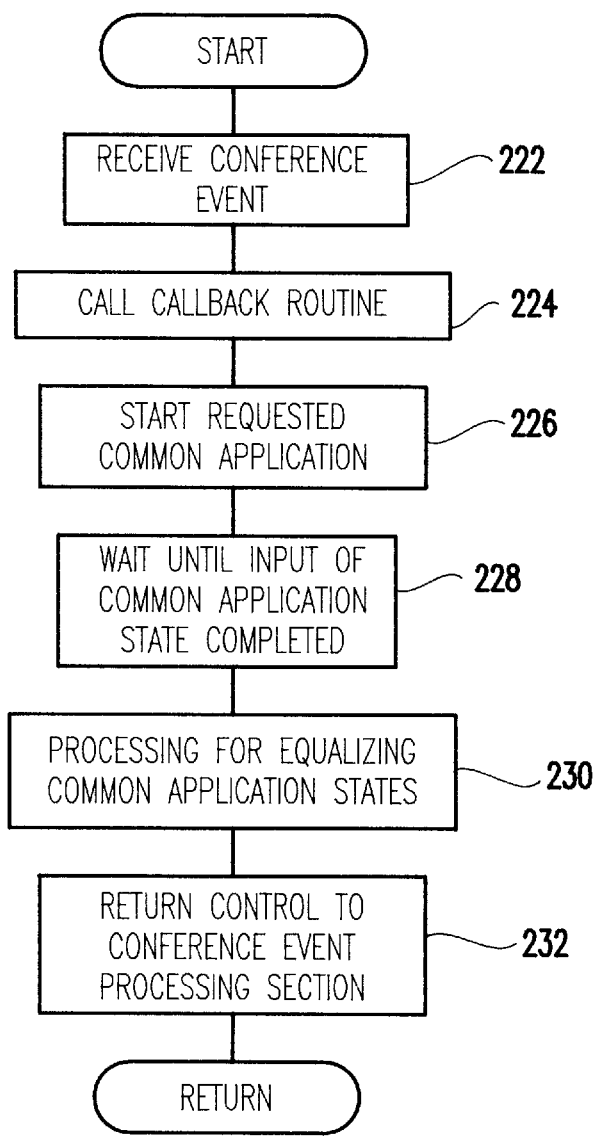
FIG. 8 is a flowchart showing the flow of processing in a requested terminal when a plurality of users shares a common application.
Figure 9:
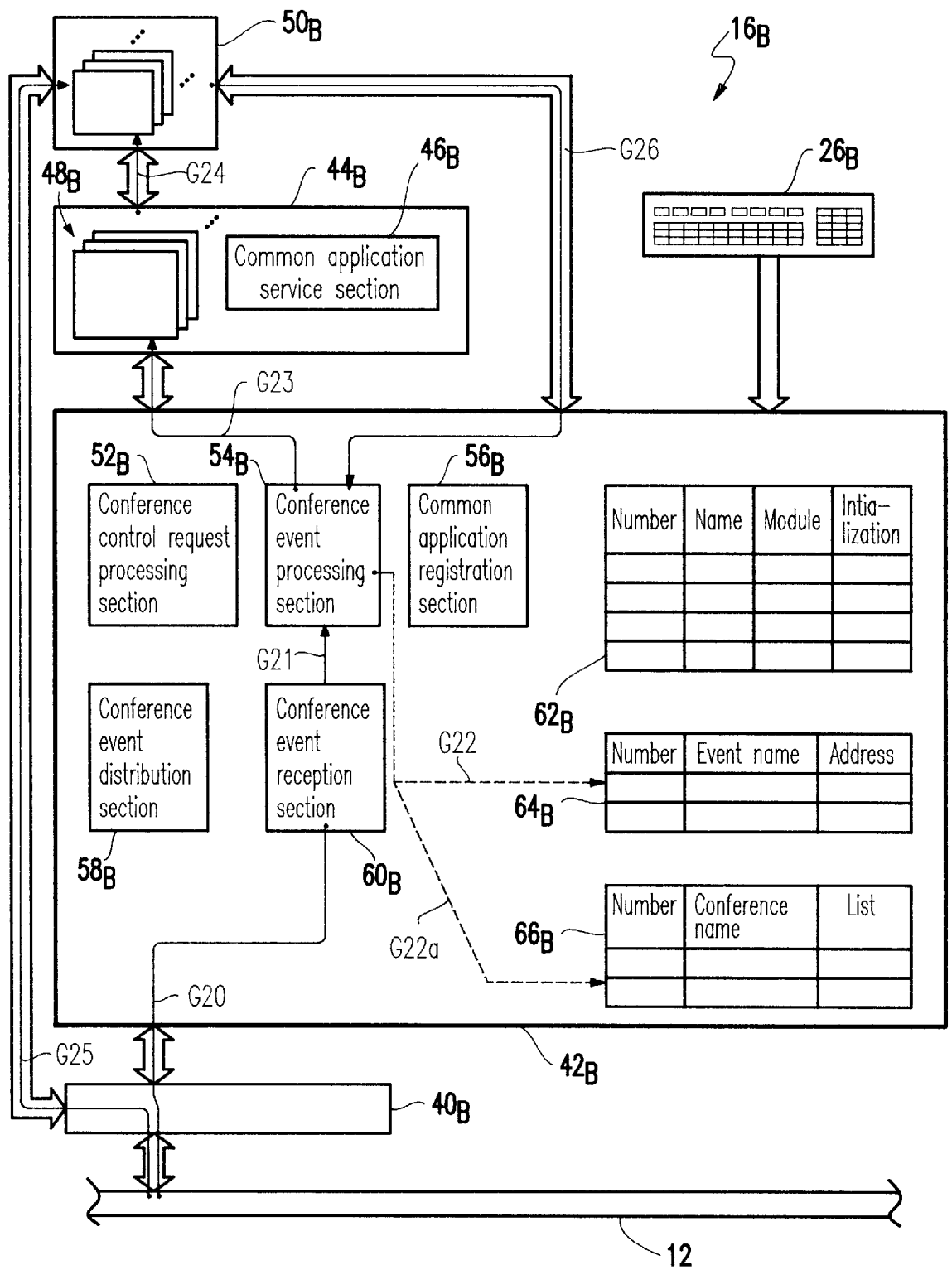
FIG. 9 is a conceptual view showing the flow of processing in a requested terminal when a plurality of users shares a common application.

When a signal based on transfer data is input to the conference event reception section $60_B$ from the terminal of another user (signal path G20, FIG. 9), the sharing routine in FIG. 8 is executed and the conference event reception section $60_B$ receives a conference event. The conference event received by the conference event reception section $60_B$ is output to the conference event processing section $54_B$ (step 222, signal path G21).

The conference event processing section $54_B$ reads a conference number and a common application number from the parameter of the input conference event and references the conference table $66_B$ (signal path G22a) and the callback routine table $64_B$ (signal path G22) to obtain the address of a callback routine corresponding to the conference event of a conference room in which a common application is included and requests starting the callback routine (signal path G23). A common application managing section $44_B$ calls the requested callback routine to start it (step 224). The conference event processing section $54_B$ waits for the next processing until processing of the callback routine terminates.

The callback routine of a common application designates starting the common editor S serving as a common application corresponding to the common editor S of the user A (signal path G24) and starts the common editor S at the terminal B of the user B (step 226). In this case, it is preferable for the common application to store all current states or accept a state sent from another unit as a new state to realize sharing during execution.

When receiving termination of a start, the common application section of the user B waits until reception of transfer data to be shared sent from another user terminates (step 228, signal path G25). When reception of transfer data terminates, the common editor of the user B performs processing so as to coincide with the state of the common editor S of the user A (step 230). After processing terminates, the common application section $50_B$ outputs a termination signal to the conference event processing section $54_B$ to terminate processing of the conference event which is conference control in the conference event processing section $54_B$ of the user B (step 232, signal path G26).

Synthetically, a request for sharing the conference event of the common editor is issued to the conference control section of the user A from the user A, the conference control section of the user A communicates with conference control sections of users B and C, and a callback routing for sharing the conference event of the common editor S is called by terminals of users A, B, and C. The callback routine of the common editor of the user A communicates with the callback routine of the common editor of users B and C. The common editor of the terminal of the user A first terminates execution of all processing before sharing to wait for the state to become steady and thereafter starts the common editor with terminals of users B and C. After it is confirmed that the common editor is started by editors of users B and C, the current state of the common editor S is sent to users B and C. When the above processing terminates, users A, B, and C terminate callback routine processing. When callback routine processing terminates and control returns to the conference control section, common editors S in the same state are working in terminals of three users. Thereafter, it is possible to input data to the common editor.

Thus, it is possible to share a common application under execution by clearly separating conference control section processing from that of the common application, managing the conference event notification of sharing a common application by the conference control section, providing the common application with functions for storing the current execution state and realizing a new state, and shifting to the same state by synchronizing common terminal applications.

Figure 10:
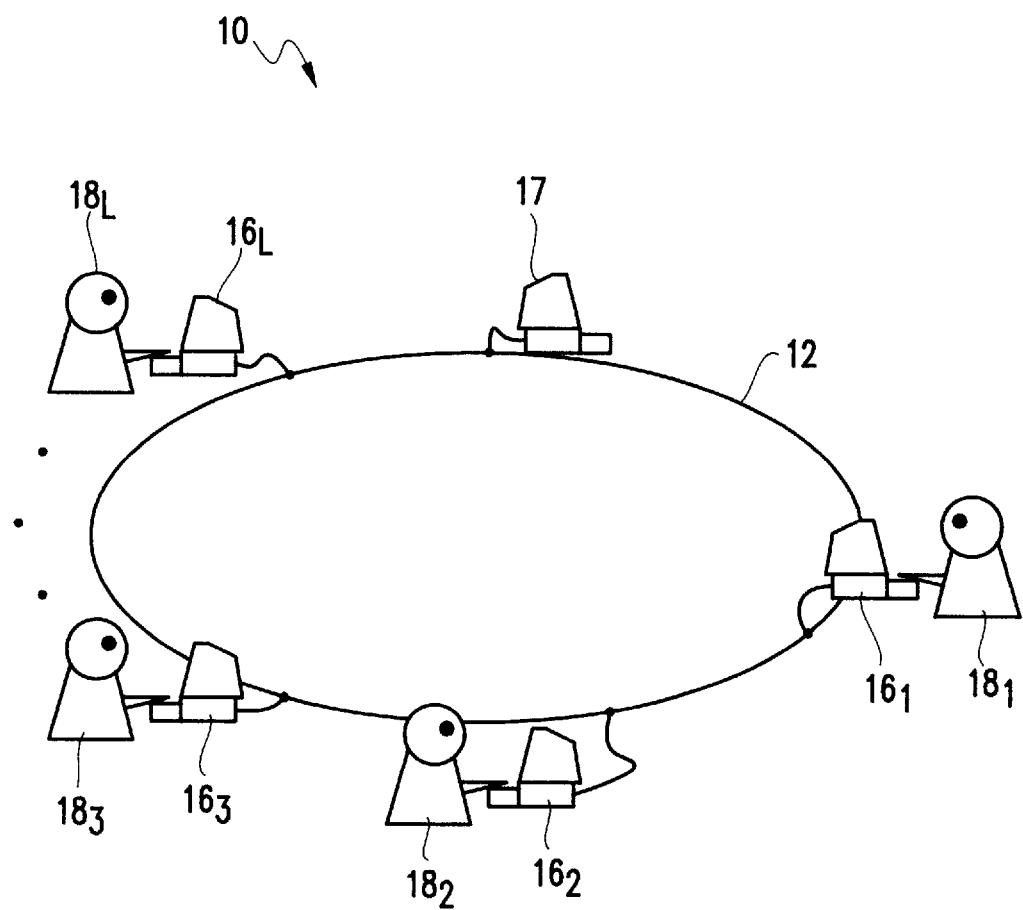
FIG. 10 is a schematic block diagram showing the conference system of the second embodiment.

The second embodiment is described below. In the first embodiment, a case is described in which only the terminal of each user participating in a conference is connected by a network or the like. However, the present invention is not restricted to the above case. As shown in FIG. 10, it is also possible to manage a conference by connecting one or more centralized managing devices 17 to a network or the like. For the second embodiment, the same portion with that of the first embodiment is provided with the same symbol and its detailed description is omitted. Therefore, only portions different from those of the first embodiment are described below. The conference system 10 of this embodiment, as shown in FIG. 10, comprises an integrated controller 17 comprising a host computer such as a microcomputer connected to a network 12 and L (L is a natural number) terminal $16_1$ to $16_L$.

Figure 11:
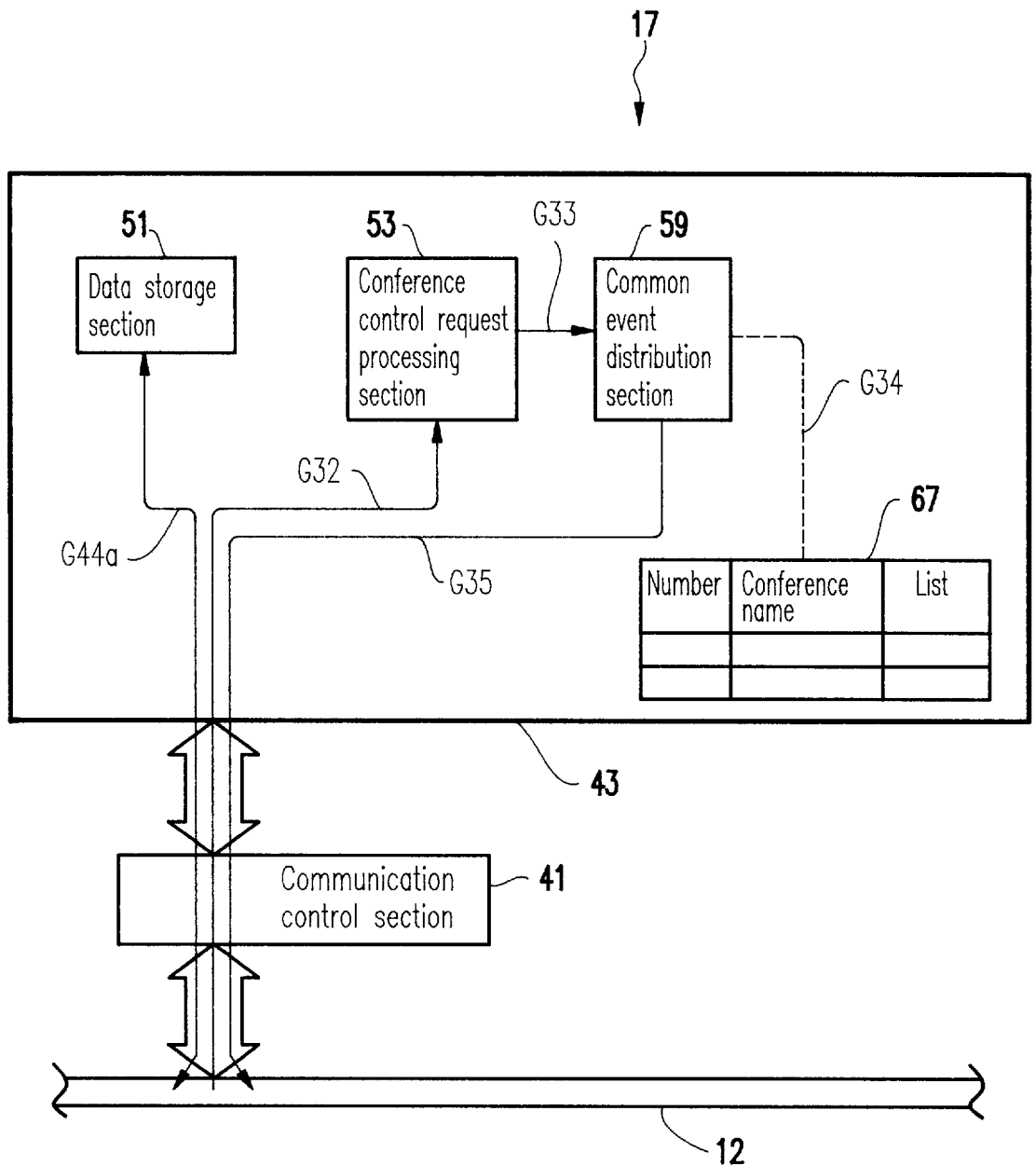
FIG. 11 is a conceptual view showing the flow of processing in an integrated controller when a plurality of users shares a common application in the second embodiment.

As shown in FIG. 11, the integrated controller 17 comprises a communication control section 41 for communicating data with a terminal and a conference control section 43 for controlling conference operations such as activation and termination of a conference room opened among a plurality of terminals and enrollees entering and exiting the conference. The communication control section 41 is connected to the network 12 and also to the conference control section 43. The conference control section 43 comprises a conference control request processing section 53, a conference event distribution section 59, and a data storage section 51 for holding an executed state of a common application. The conference control request processing section $52_i$ generates a conference event corresponding to a change in the conference state when a request for changing conference states is output from various terminals. The conference event distribution section $58_i$ distributes and outputs a conference event for a conference state change request to enrollees in the conference.

Figure 12:
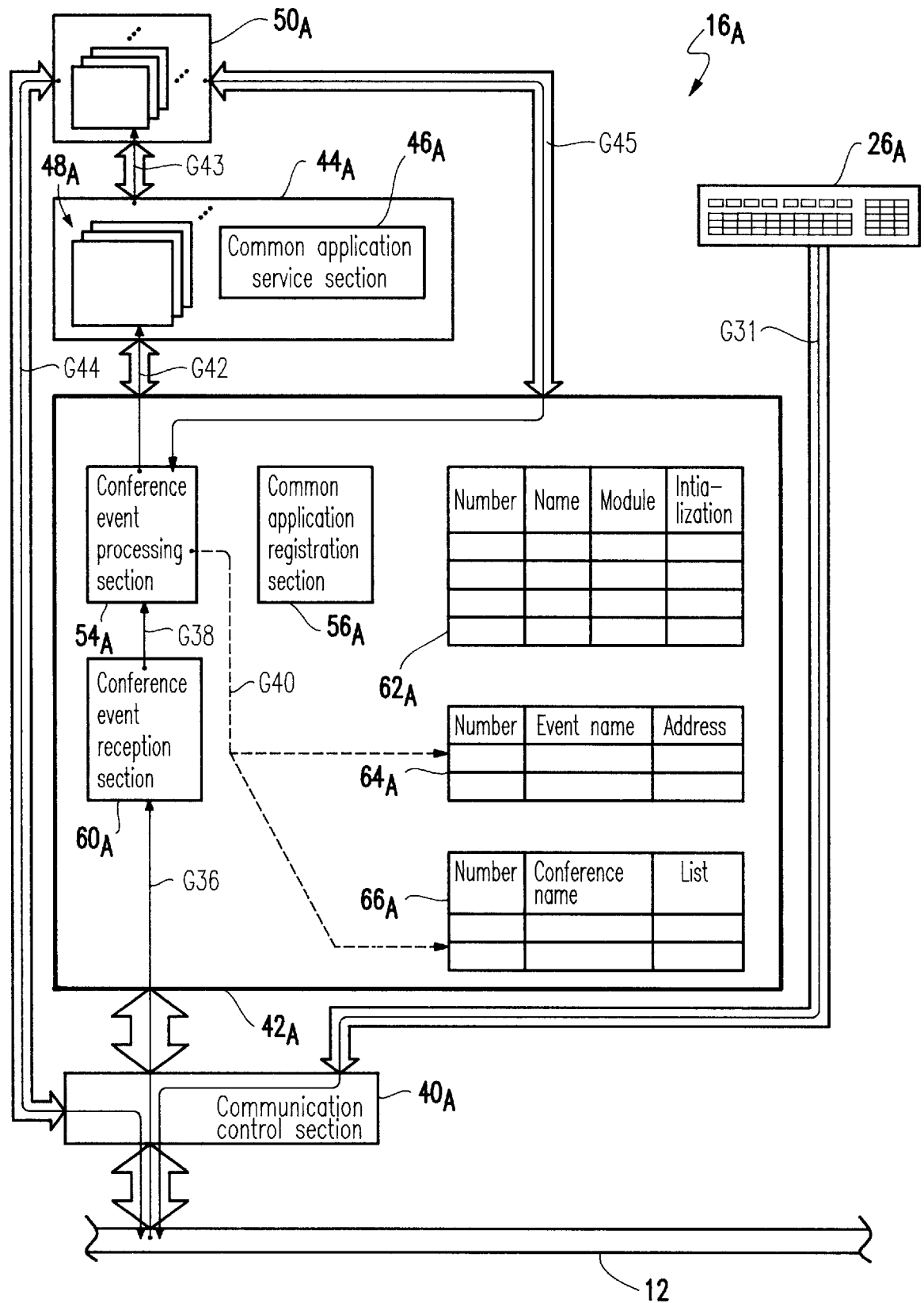
FIG. 12 is a conceptual view showing the flow of processing in a request-side terminal unit when a plurality of users shares a common application in the second embodiment.

A terminal $16_A$ comprises a PC $22_A$, a display $24_A$ and a keyboard $26_A$ like that of the first embodiment. Because other terminals have the same constitution, their description is omitted. As shown in FIG. 12, the PC $22_A$ of the terminal $16_A$ mainly comprises a communication control section $40_A$ for communicating data with another $PC_j$ (j:1≦j≦L, i ≠j) and the integrated controller 17, a conference control section $42_A$ (described later) for executing a conference room opened at a terminal, a common application section $50_A$ comprising one or more programs shared by users and concurrently used in a conference room, and a common application management section $44_A$. The communication control section $40_A$ is connected to the network 12 and a keyboard $26_A$ and also connected to the conference control section $42_A$ and the common application section $50_A$. The communication control section may perform one-to-one data transfer to and from other terminals separately from an opened conference. The conference control section $42_A$ is connected to the common application section $50_A$ and common application management section $44_A$. The common application section $50_A$ is connected to the common application management section $44_A$.

The conference control section $42_A$ comprises a common application registration section $56_A$ a conference event distribution section $58_A$, a conference event reception section $60_A$, a common application table $62_A$, a callback routine table $64_A$, and a conference table $66_A$.

The conference event processing section $54_i$ delivers a conference event corresponding to a conference state change. The common application registration section $56_i$ dynamically registers a common application at starting or the like. The conference event reception section $60_i$ receives a conference event for a conference state change request sent from the integrated controller.

The functions of this embodiment are described below. For each terminal of this embodiment, a conference room opened (used) by starting a conference program is performed by referencing a conference event and the conference table $66_i$ from the integrated controller. That is, a user who can use a plurality of conference rooms is repeatedly entered in the conference table $66_i$. Therefore, one or more conference rooms are selected from the conference room list of the conference table $66_i$ by the integrated controller or one or more conference rooms are selected by default, for example, at the start of the program. A field is registered in the conference table $66_i$ and the table $66_i$ transmits the registered field to the integrated controller 17 when a conference is opened. Because it is possible to register a plurality of conference rooms in the conference table $66_i$, a case of registering one conference room is described below for simplicity.

First, the start processing of this embodiment is described below. Because the start of this embodiment is almost the same as that of the first embodiment in FIG. 5, it is described by referencing FIG. 5 by giving the same number to the processing equivalent to that in FIG. 5. When a power switch (not shown) of a terminal PC $16_i$ is turned on, the terminal $16_i$ is ready for operation and the conference room system 11 for performing operations such as opening of a conference and participation in the conference is started by a designation through a keyboard, and data is sent to an integrated controller. The integrated controller references a conference table 67 and sends a conference event showing the start to the started terminal. The common application registration section $56_i$ of the conference control section $66_i$ of the terminal $16_i$ receiving the conference event showing the start reads a common application name from the application file APF storing common application names (corresponding to step 102, FIG. 5). Then, it is determined whether all common application names stored in the application file APF are read by determining the end of the application file APF (step 104). In the case of a negative determination, a module stored in memory $34_i$ corresponding to a common application with the read name is loaded in RAM (memory) by the common application registration section $56_i$ (step 106). The common application registration section $56_i$ gives a serial number to the common application with the read name and enters the serial number, the common application name, the address of the module loaded in RAM (memory), and the address of an initialization routine in the common application table $62_i$ (step 108). The initialization routine is located at a predetermined location (e.g., first opening function) of the loaded module, which shows the type of conference and a default and includes the address of a callback routine corresponding to a conference event included in a common application. Then, the common application registration section $56_i$ calls the initialization routine of the common application with the read name (step 110) and obtains the address of a callback routine corresponding to a conference event from the called initialization routine (step 112). Then, the common application registration section $56_i$ establishes a correspondence between the address of the callback routine thus obtained and to a common application number and an event name and enters the common application number, event name, and callback routine address in the callback routine table $64_i$ (step 114).

The above processing is repeated for all common application names stored in the application file APF.

Therefore, the conference control section $42_i$ defines conference state change details as conference events (FIG. 4) and reports defined conference events to the common application section $44_i$. Thereby, it is possible for a plurality of conference events of a common application to keep a consistent state independent of the conference state change.

Figure 13:
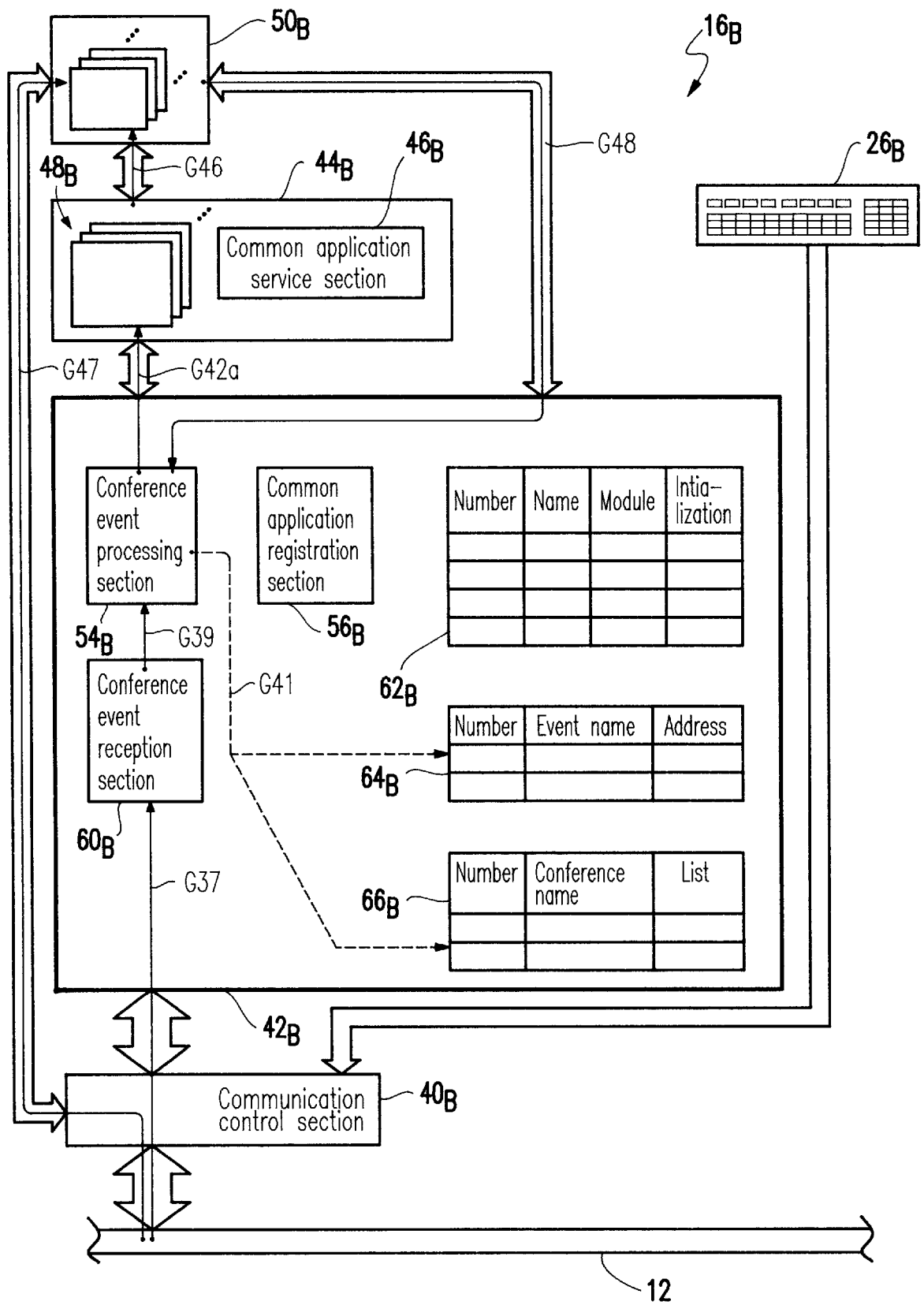
FIG. 13 is a conceptual view showing the flow of processing in a requested terminal when a plurality of users shares a common application in the second embodiment.

A procedure for sharing a common application under execution is described below by referencing FIGS. 11 to 13. Hereafter, to simplify the description, it is assumed that a common editor S which is the common editor S serving as a common application locally executed only at the terminal $16_A$ of a user A in a conference room opened by three users A, B, and C is shared by the three users. It is also possible to assume that a common application executed only by one user outside the conference room is shared by three users.

According to input through a keyboard $26_A$ of the user A, a request for sharing the conference event of the common editor S is output to the integrated controller 17 (signal path G32 in FIG. 11 and the signal path 31 in FIG. 12).

The conference control request processing section 53 of the integrated controller 17 generates an conference event CE with the event name BEGINSHARE necessary for processing and outputs the conference event (event name: BEGINSHARE) to a conference event distribution section 59 (signal path G33, FIG. 11). The conference event distribution section 59 references a conference table 67 (signal path G34 FIG. 11) to determine that users A, B. and C are enrollees at a conference room and distributes the conference event to these three users. The conference event is also distributed to the user A who requests sharing of the conference event and terminals $16_B$ and $16_C$ of users B and C through a communication control section 41 of the integrated controller 17, network 12, and communication control sections $40_A$, $40_B$, and $40_C$ (signal path G35, FIG. 11; signal path 36, FIG. 12; signal path 37, FIG. 13).

Conference event reception sections $60_A$, $60_B$, and $60_C$ of users A, B, and C receive a conference event. The conference event received by the conference event reception sections is outputted to each conference event processing section (signal path 38, FIG. 12; signal path 39, FIG. 13). Each conference event processing section 54 reads a conference number and common application number from the parameter of the input conference event, references a conference table and a callback routine table (signal path 40, FIG. 12; signal path 41, FIG. 13) and obtains the address of a callback routine corresponding to the conference event of the common application to request starting the callback routine (signal path 42, FIG. 12; signal path 42a, FIG. 13). Each common application management section calls and starts the requested callback routine. Each conference event processing section waits for the next processing until the processing of the callback routine terminates. Subsequent processing is executed in the callback routine of a common editor independent of the conference control section.

The callback routine of the common application of the user A requesting sharing orders the common editor S of the user A to terminate processing (signal path G43) and terminates the processing of the common editor S currently being executed. The common application section of the user A receives the termination of processing, stores the current state of the common editor S, and outputs the stored state to the integrated controller 17 (signal paths G44 and G44a). Thereafter, to terminate the processing of the conference event which is the conference control in the conference event processing section $54_A$, the common application section $50_A$ outputs a termination signal to the conference event processing section $54_A$ (signal path G45).

Then, processing by terminals $16_B$ and $16_C$ of users B and C for which sharing is requested is described below. Because almost the same processing is performed for users B and C, processing by the terminal $16_B$ of the user B is described below for simplicity.

Base on the conference event sent from the integrated controller 17, the conference event processing section $54_B$ reads a conference number and a common application number from the parameter of the input conference event, references a conference table and the callback routine table $64_B$ and obtains the address of a callback routine corresponding to the conference event of the conference room including a common application to request starting the callback routine (signal path G42a). The common application managing section $44_B$ calls and starts the requested callback routine. The conference event processing section $54_B$ waits for the next processing until callback routine processing terminates.

The callback routine of a common application orders starting the requested common editor S (signal path G46) and starts the common editor S at the terminal $16_B$ of the user B. In this case, it is preferable to set the common application so that it can store all current states and receive a state sent from an external unit as a new state to realize sharing during execution.

By receiving the start termination, the common application section of the user B waits until the reception of transfer data from the integrated controller 17 terminates (signal path G47). The user B then processes the common editor S so that the state of the common editor B coincides with the state of the common editor S of the user A. After processing terminates, the common application section $50_B$ outputs a termination signal to the conference event processing section $54_B$ to terminate processing of the conference event which is conference control in the conference event processing section $54_B$ of the user B (signal path G48).

Therefore, the conference control section of each user communicates with the integrated controller, the callback routine for sharing the conference event of the common editor S by terminals of users A, B, and C, and it is possible to perform processing so that common editors in the same state are operated in terminals of the three users.

Thus, because this embodiment manages generation and reporting of a conference event sharing a common application by an integrated controller, it is possible to decrease additional processing of each terminal and share a common application under execution by using fewer execution programs and less memory.

Figure 14:
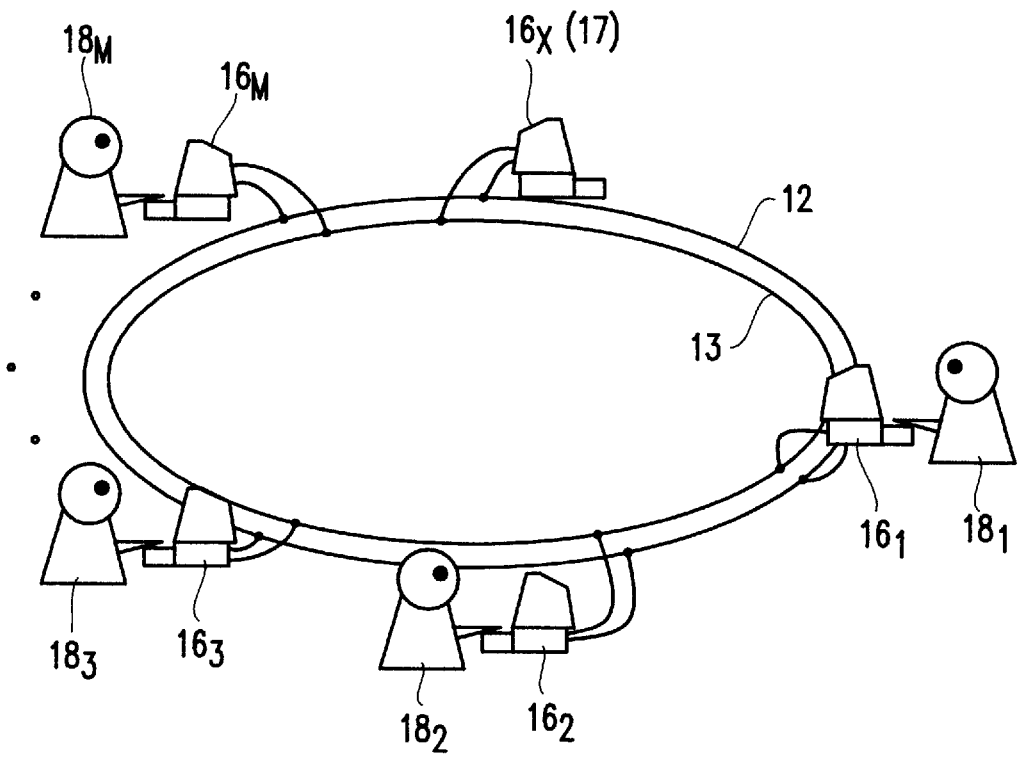
FIG. 14 is a schematic block diagram showing a conference system for separately sending or receiving voice and animation information.

The conference system 10 of the above embodiment also makes it possible to send or receive voice information including the voice of a user and music and animation information including the face of the user as transfer data. In this case, it is also possible to send or receive voice and animation information through transmission means 13 such as a separate line or separate network as shown in FIG. 14. Therefore, by sending or receiving voice information and animation information through a separate line or network, it is possible to decrease data capacity and manage a conference in real time even using conference system having voice and animation information as data.

Figure 15:
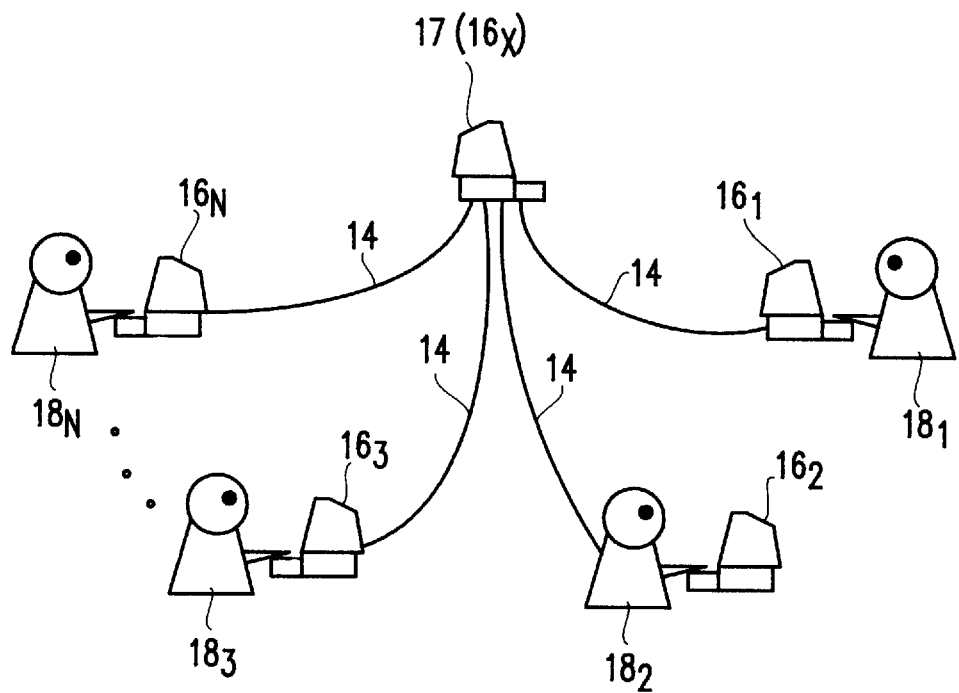
FIG. 15 is a schematic block diagram showing a different connection configuration among a plurality of terminals in a conference system.

In the above embodiment, a case of using the annular network 12 is described. However, as shown in FIG. 15, it is also possible to connect a plurality of terminal to one terminal $16_x$ (X=any one of 1 to N) or connect a plurality of terminals to an integrated controller 17.

As processing for making other user attend an opened conference, it is preferable to perform attendance request processing for asking whether the user attends the conference with a terminal $16_j$ for which attendance is requested. In this case, it is preferable to set a terminal $16_i$ of the attendance request side when requesting another user to attend the conference so that the terminal cancels the above attendance procedure when transfer data showing that other user $18_j$ refuses attendance is returned or no response returns because the other user $18_j$ does not operate the terminal $16_j$ or is out (after a preset time of a timer lapses).

Moreover, to proceed with the conference, the common application use right may come into contention. In the case of the above common blackboard, the common blackboard use right contends because a plurality of users simultaneously request the common blackboard use right. In this case, it is necessary to make users wait their turn to obtain the use right by giving priority to the use right. Data showing use right permission and the turn are sent to the conference event reception section and the common application section of each user. Based on this data, the conference event processing section allows a user to use the common blackboard. It is preferable to set up an application program for the common blackboard to enable a user to input data with an input unit such as a keyboard or mouse and to send data for making input by users other than the permitted user impossible to prevent erroneous input.

As described above, the present invention has advantages that only a dynamically necessary application among a plurality of applications can be incorporated into a real-time conference system for multiple enrollees in which applications are executed by the conference device of each enrollee at the start of the conference system and these applications under execution can be started and shared by the terminal of another user in the same state.

Having thus described our invention, what we claim as new and desire to secure by Letters Patent is:

1. In a conference system including a plurality of conference devices with at least one requesting conference device executing an application program to be used in a conference, a method for dynamically sharing the application program among the plurality of conference devices while maintaining a same state of the application program at each of the plurality of conference devices, said method comprising the steps of:

communicating a request to share the application program from said requesting conference device executing the application program to other ones of said conference devices enrolled in the conference;

storing a current state of the application program in the requesting conference device;

loading the application program by said other ones of said conference devices enrolled in the conference;

communicating the current state from the requesting conference device to said other ones of said conference devices enrolled in said conference; and processing the application program by said other ones of said conference devices enrolled in said conference to acquire a state equal to the current state.

2. The conference system as recited in claim 1 wherein the application program is a blackboard program for displaying a screen on said conference devices on which users can write messages.

3. In a conference system including a plurality of conference devices wherein a requesting conference device is executing an application program, said requesting conference device adapted for dynamically sharing the application program among the plurality of conference devices while maintaining said plurality of conference devices in a same state, said requesting conference device comprising:

application program storage means for storing an application program used for a conference;

callback protocol storage means, coupled to the application program storage means, for storing a processing program along with identifiers for sharing the application program;

conference control means for maintaining all conference devices in a same state coupled to the callback protocol storage means, wherein one or more registered identifiers of the processing program corresponding to event information indicating a changed state of a conference are previously stored, said conference control means communicating the event information corresponding to the changed state to all said conference devices, said conference control means further for changing a conference execution state to be equal to the changed state corresponding to communicated event information and executing the processing program corresponding to the communicated event information by referencing the registered identifiers; and communication control means, coupled to the conference control means, for communicating transferred data including the event information.

4. The conference device of claim 3, where the plurality of conference devices communicatively couple so that the event information can be input or output.

5. The conference system as recited in claim 3 wherein the application program is a blackboard program for displaying a screen on said conference devices on which users can write messages.

* * * * *